United States Patent [19]

Salmi

[11] 3,939,943

[45] Feb. 24, 1976

[54] LUBRICATION OF PISTON OPERATED DRILL WITH CENTRAL FLUSHING TUBE

[75] Inventor: Pekka Salmi, Tampere, Finland

[73] Assignee: Oy Tampella AB, Tampere, Finland

[22] Filed: Apr. 18, 1975

[21] Appl. No.: 569,532

[30] Foreign Application Priority Data

Apr. 25, 1974 Finland .............................. 1269/74

[52] U.S. Cl. .......... 184/6.14; 417/550; 173/DIG. 3; 184/27 R

[51] Int. Cl.$^{2}$ .......................................... F16N 25/02

[58] Field of Search........... 184/27 R, 6.14, 7 D, 56, 184/6; 417/550; 173/78, DIG. 3

[56] References Cited

UNITED STATES PATENTS

| | | | |
|---|---|---|---|
| 3,082,741 | 3/1963 | Huffman | 173/78 |
| 3,191,693 | 6/1965 | Lincoln | 173/78 |
| 3,229,864 | 1/1966 | Roder | 417/550 |
| 3,248,021 | 4/1966 | Corsette | 417/550 |
| 3,362,344 | 1/1968 | Duda | 417/550 |
| 3,581,845 | 6/1971 | Nederynen | 173/DIG. 3 |

FOREIGN PATENTS OR APPLICATIONS

| | | | |
|---|---|---|---|
| 853,683 | 10/1952 | Germany | 417/550 |
| 394,347 | 4/1924 | Germany | 417/550 |

*Primary Examiner*—Richard C. Pinkham
*Assistant Examiner*—Marvin Siskind
*Attorney, Agent, or Firm*—Roylance, Abrams, Berdo & Kaul

[57] ABSTRACT

A drill comprising a body means having an axial, generally cylindrical, interior space is provided with a first cylindrical piston axially slidable between a first and a second position within the cylindrical space. The piston is provided with an extension in the form of a second piston, and the first and second piston surround an axially disposed flushing tube, which with the piston defines a first annular oiling space. The flushing tube, the first piston and the body define a second annular oiling space, while the flushing tube, the second piston and the body define an annular pumping zone. A source of lubricating fluid communicates with the pumping zone by means of the body inlet as the first piston is moving towards said first slidable position, and the pumping zone communicates with the second annular oiling space by means of the first annular oiling space as the first piston is moving towards said second slidable position. The first annular oiling space and the inlet are provided with one-way valve. In this manner, the surfaces between the flushing tube and the piston, as well as the surfaces, for example, between a drill neck and a bushing in the second annular oiling space, are effectively lubricated and cooled.

2 Claims, 1 Drawing Figure

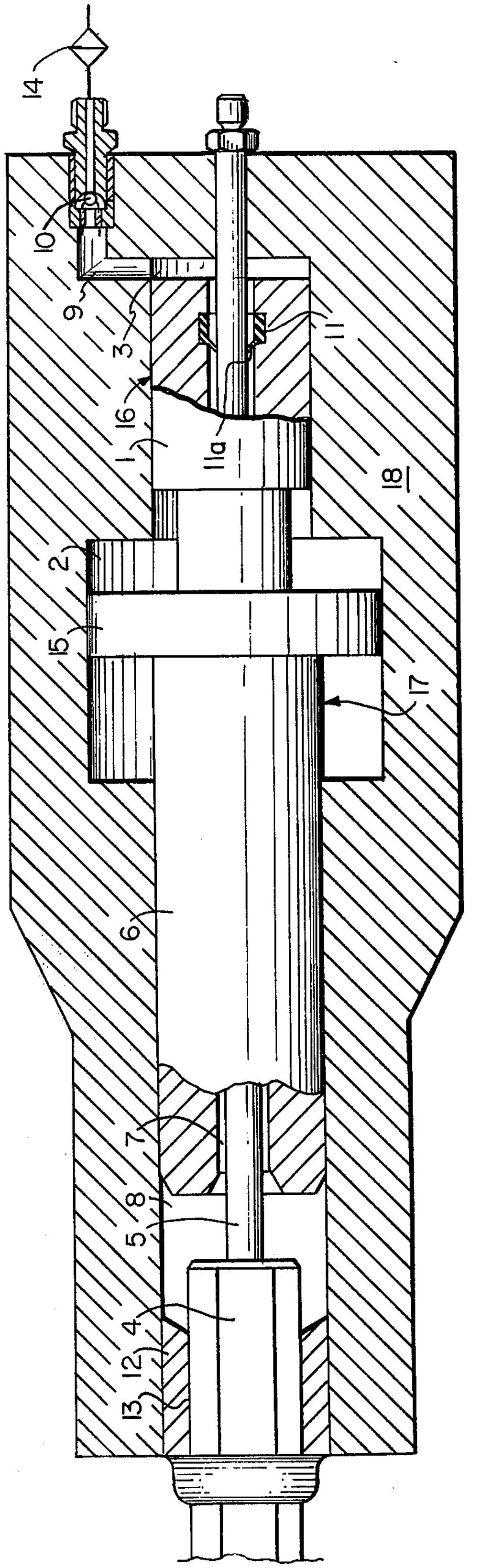
14
10
9
3
11
16
1
11a
18
2
15
17
6
7
8
5
4
12
13

LUBRICATION OF PISTON OPERATED DRILL WITH CENTRAL FLUSHING TUBE

This invention relates to the lubrication and cooling of a piston-operated device and to the apparatus therefor. More particularly, this invention relates to an apparatus for improving the oiling and cooling in rock drills incorporating a piston which consists of a flange, a rod and an extension.

In modern pneumatic as well as hydraulic rock drills, striking pistons are used which have, besides a flange and a rod, also a cylindrical extension that is useful in the operation of the rock drill. The extension moves to and fro in the cylindrical space. The only connection of the cylinder space with the outside air is a circular canal between the piston and the flushing tube. Therefore, when the piston moves to and fro, the pressure in the cylinder space is either above or below the atmospheric pressure. The overpressure tries to become balanced through the circular canal into the front cylinder space. The term "front" as used herein means that end of the rock drill to which the drill steel is attached, and the "rear" means the opposite end of the rock drill.

Pneumatic rock drills are oiled with oil that is mixed with air, while hydraulic rock drills are lubricated with oil alone. In pneumatic rock drills the mixture of oil and air, and in hydraulic rock drills the oil, can flow from a rear cylinder space along the circular canal between the extension and the body into the cylinder space, from which the oil can further flow between the flushing tube and the piston into the front space of the rock drill. The oil improves the oiling between the piston and the flushing tube, as well as between the steel neck and the drill bushing, but due to the pressure changes in the cylinder space, this oiling is irregular and insufficient. Objects of the present invention include the elimination of the aforesaid disadvantage and improvement in the oiling of the surfaces between the piston and the flushing tube.

These and other objects are achieved employing the drill means of the present invention which comprises body means having an axial, generally cylindrical, interior space, said body means having an inlet means; first cylindrical piston means axially slidable between a first position and a second position within said cylindrical space, the outer surface of said first piston means being in sliding contact with an inner surface of said body means, said first piston means having an axially disposed extension, said extension being a second piston means axially slidable with said first piston means; said first piston means and said second piston means surrounding an axial flushing tube means, said flushing tube means and said first and second piston means defining a first annular oiling space; said flushing tube means, said first piston means and said body means defining a second annular oiling space, said flushing tube means, said second piston means and said body means defining an annular pumping space; a source of lubricating fluid communicating with said pumping space by means of said inlet means as said first piston means is moving towards said first slidable position, and said pumping space communicating with said second annular oiling space by means of said first annular oiling space as said first piston means is moving towards said second slidable position.

The inlet means is provided with a first one-way valve means, said first valve means preventing said source of lubricating fluid from communicating with said pumping space as said first piston means is moving towards said second slidable position. The first annular oiling space is provided with a second one-way valve means, said second valve means preventing said second annular oiling space from communicating with said pumping space as said first piston means is moving towards said first slidable position. The second valve means is provided generally adjacent said pumping space.

Thus, the present invention provides an apparatus for lubricating a rock drill, which comprises providing a body having an axial, generally cylindrical, interior space, said body having an inlet and a piston axially slidable between a first position and a second position within said cylindrical space, said piston having an axially disposed extension, said piston and said extension surrounding an axial flushing tube, said piston, said piston extension and said flushing tube defining a first annular oiling zone, and said piston, said flushing tube and said body defining a second annular oiling zone; said extension, said flushing tube and said body defining a pumping zone; and passing a lubricating fluid into said pumping zone as said piston is moving towards said first slidable position, and passing said lubricating fluid from said pumping zone to said second zone by means of said first zone as said piston is moving towards said second slidable position.

Other objects and advantages of the present invention will become apparent upon viewing the accompanying drawing which is an elevational view of the apparatus of the present invention partly sectioned, showing the piston near the beginning of a work stroke.

According to the invention, the improvement is obtained by using the extension of the piston and the cylindrical space of the extension as an oil pump which pumps the air-oil mixture to the points mentioned above.

Referring now to the drawing, a canal 9 is drilled in the body 18 and leads from the space 3 to the outside of the rock drill and a one-way valve 10 is placed into this canal. The valve 10 is a conventional one-way, spring loaded ball valve which only permits the air-oil lubricating fluid mixture to pass into canal 9 from an outside source (not shown). However, any suitable one-way valve can be utilized. Thus, the valve 10 lets air into the space 3 from the outside of the rock drill, but prevents the air flow in the opposite direction. Connected with valve 10 may also be a filter 14 for filtering the incoming air. Oil can be mixed with the air flowing from the outside source into the space 3 in order to improve the oiling. In order to make the air-oil mixture flow in the annular canal, or oiling space 7, between the piston 17 and the flushing tube 5 only from the space 3 into the front space 8, a one-way valve 11 is placed between the flushing tube and the piston, which valve lets the air-oil mixture flow from the space 3 into the front space 8 but prevents the flow in the opposite direction. The flushing tube 5 leads from the nipple through the body 18, piston 17 and drill neck 4 for conveying a flushing liquid, such as water, into the bore of the tool or or drill steel. For this purpose, a water hose may be attached to the nipple. Valve 11 is a one-way valve of conventional design. As illustrated, valve 11 is an elastomeric valve having a shoulder 11a which resists air-oil flow from space 8 to space 3, but permits flow in the opposite direction.

As the extension 1 moves towards the front space 8, a vacuum is generated in the space 3, because the valve 11 prevents the flow of the air into the space 3. Therefore, the air-oil mixture now flows from the outside source through the valve 10 into the space 3. As the extension 1 moves in the opposite direction, the pressure in the space 3 rises, because the air cannot flow out through the valve 10. Therefore, the air-oil mixture now flows through the valve 11 into the front space 8.

The present invention offers many advantages, including the fact that the extension 1 of the piston 17 and its space 3 make up a pump that oils the surfaces between the flushing tube 5 and the piston 17 as well as the surface 13 between the drill neck 4 and the drill bushing 12 efficiently. The pump does not affect harmfully the operation of the rock drill, because the power taken by the pump according to the invention is small in comparison with the power of the rock drill. This improvement in oiling also improves the cooling and decreases the generation of frictional heat.

Generation of unnecessary vacuum in the space 3 of the extension is eliminated and the air-oil mixture flows in the canal between the piston 17 and the flushing tube 5 only in one direction, from the rear space 3 to the front space 8.

Although the invention has been described in considerable detail with particular reference to certain preferred embodiments thereof, variations and modifications can be effected within the spirit and scope of the invention as described hereinbefore, and as defined in the appended claims.

What is claimed is:

1. A drill means, which comprises:

body means having an axial, generally cylindrical, interior space, said body means having an inlet means;

first cylindrical piston means axially slidable between a first position and a second position within said cylindrical space, the outer surface of said first piston means being in sliding contact with an inner surface of said body means, said first piston means having an axially disposed extension, said extension being a second piston means axially slidable with said first piston means;

said first piston means and said second piston means surrounding an axial flushing tube means, said flushing tube means and said first and second piston means defining a first annular oiling space;

said flushing tube means, said first piston means and said body means defining a second annular oiling space, said flushing tube means, said second piston means and said body means defining an annular pumping space; and a source of lubricating fluid connected to said inlet means;

first one-way valve means communicating with said inlet means for preventing said source of lubricating flüid from communicating with said pumping space as said first piston means is moving towards said second slidable position and for permitting said source to communicate with said pumping space as said first piston means is moving towards said first slidable position; and second one-way valve means communicating with said first annular oiling space for preventing said second annular oiling space from communicating with said pumping space as said first piston means is moving toward said first slidable position and for permitting said pumping space to communicate with said second annular oiling space as said first piston means is moving toward said second slidable position.

2. The drill means of claim 1 wherein said second valve means is provided generally adjacent said pumping space.

* * * * *